(12) United States Patent
Lee et al.

(10) Patent No.: US 8,391,421 B2
(45) Date of Patent: Mar. 5, 2013

(54) EDA-BASED DETECTION OF COMMUNICATION SIGNALS

(75) Inventors: Daniel Chonghwan Lee, Burnaby (CA); Muhammad Naeem, Surrey (CA)

(73) Assignee: Simon Fraser University, Burnaby (CA)

( * ) Notice: Subject to any disclaimer, the term of this patent is extended or adjusted under 35 U.S.C. 154(b) by 847 days.

(21) Appl. No.: 12/488,503

(22) Filed: Jun. 19, 2009

(65) Prior Publication Data

US 2010/0158159 A1    Jun. 24, 2010

Related U.S. Application Data

(60) Provisional application No. 61/129,328, filed on Jun. 19, 2008.

(51) Int. Cl.
*H04L 27/08* (2006.01)
(52) U.S. Cl. ........ 375/340; 375/267; 375/260; 375/349; 375/347
(58) Field of Classification Search .......... 375/340, 375/267, 260, 349, 347
See application file for complete search history.

(56) References Cited

U.S. PATENT DOCUMENTS

| | | | | |
|---|---|---|---|---|
| 6,918,098 | B2* | 7/2005 | Smith et al. | 716/106 |
| 2005/0089112 | A1* | 4/2005 | Piechocki et al. | 375/267 |
| 2006/0045200 | A1* | 3/2006 | Bocquet | 375/267 |
| 2010/0232533 | A1* | 9/2010 | Lee et al. | 375/267 |
| 2011/0138255 | A1* | 6/2011 | Lee | 714/777 |

OTHER PUBLICATIONS

Yuen, Chau et al., "Quasi-Orthogonal Space-Time Block Code", Quasi-Orthogonal Space-Time Block Code, Communications and Signal Processing—vol. 2, Chapter 4, Imperial College Press, 2007, pp. 73-111.
Jafarkhani, Hamid, Space-Time Coding: Theory and Practice, Cambridge University Press, 2005, pp. 221-271.
Giannakis, Georgios B. et al., Space-Time Coding for Broadband Wireless Communications, Wiley-Interscience, 2007, pp. 105-131.
Biglieri, Ezio et al., MIMO Wireless Communications, Cambridge University Press, 2007, pp. 140-293.
Tarokh, Vahid et al., "Space-Time Block Coding for Wireless Communications: Performance Results", IEEE Journal on Selected Areas in Communications, vol. 17, No. 3, Mar. 1999, pp. 451-461.
Sandhu, Sumeet et al., "Space-Time Block Codes: A Capacity Perspective", IEEE Communications Letters, vol. 4, No. 12, Dec. 2000, pp. 384-386.
Foschini, G.J, "Layered Space-Time Architecture for Wireless Communication in a Fading Environment When Using Multiple Antennas", Bell Lab. Tech. Journal, vol. 1, No. 2, 1996, pp. 41-59.
Bolcskei, Helmut et al., Space-Time Wireless Systems, Cambridge University Press, 2006, pp. 302-321.
Zhang, Q. et al., "On the Convergence of a Class of Estimation of Distribution Algorithms", IEEE Transactions on Evolutionary Computation, vol. 8, No. 2, Apr. 2004, pp. 127-136.
Tarokh, Vahid et al., "Space-Time Codes for High Data Rate Wireless Communication: Performance Criterion and Code Construction, IEEE Transactions on Information Theory", vol. 44, No. 2, Mar. 1998, pp. 744-765.

(Continued)

*Primary Examiner* — David Ometz
*Assistant Examiner* — Rahel Guarino
(74) *Attorney, Agent, or Firm* — Oyen Wiggs Green & Mutala LLP

(57) ABSTRACT

Methods and apparatus for recovering data from communication signals apply estimated distribution algorithms. Estimated probability distributions may be constructed to avoid deterministic values. Non-converging data elements may be resolved by performing selective local searches. Embodiments recover data from space-time-frequency block coded signals. A data receiver comprises two or more antennas and signal detectors for detecting signals received at the antennas. A data detection module constructs a fitness function based on the received set of signals and generates additional possible solution sets by an iterative process in which the fitness of possible data sequences are evaluated using the fitness function.

31 Claims, 8 Drawing Sheets

OTHER PUBLICATIONS

Telatar, I. Emre, "Capacity of Multi-antenna Gaussian Channels", Lucent Technologies, pp. 1-28, Dec. 1999.

Verdu, Sergio, "Minimum Probability of Error for Asynchronous Gaussian Multiple-Access Channels, IEEE Transactions on Information Theory", vol. IT-32, No. 1, Jan. 1986, pp. 85-96.

Wang, Xiaodong et al., "Space-Time Multiuser Detection in Multipath CDMA Channels", IEEE Transactions on Signal Processing, vol. 47, No. 9, Sep. 1999, pp. 2356-2374.

Huang, Howard et al., "Multiple Antennas in Cellular CDMA Systems: Transmission, Detection, and Spectral Efficiency", IEEE Transactions on Wireless Communications, vol. 1, No. 3, Jul. 2002, pp. 383-392.

Verdu, S., "Computational Complexity of Optimum Multiuser Detection", Algorithmica, vol. 4, 1989, pp. 303-312.

Cui, Tao et al., "An Efficient Generalized Sphere Decoder for Rank-Deficient MIMO Systems", IEEE Communications Letters, vol. 9, No. 5, May 2005, pp. 423-425.

Du, Y. et al., "Improved Multiuser Detector Employing Genetic Algorithm in a Space-Time Block Coded System", EURASIP J. of Applied Signal Processing, 2004, pp. 640-648.

Foschini, G.J et al., "On Limits of Wireless Communications in a Fading Environment when Using Multiple Antennas", Wireless Personal Communications, vol. 6, 1998, pp. 311-335.

Damen, O. et al., "Lattice code decoder for space-time codes", IEEE Comm. Let., vol. 4, No. 5, May 2000, pp. 161-163.

Hassibi, B. et al., "On the Sphere-Decoding Algorithm I. Expected Complexity", IEEE Transactions on Signal Processing, vol. 53, No. 8, Aug. 2005, pp. 2806-2818.

Vikalo, H. et al., "On the Sphere-Decoding Algorithm II. Generalizations, Second-Order Statistics and Applications to Communications," IEEE Transactions on Signal Processing, vol. 53, No. 8, Aug. 2005, pp. 2819-2834.

Jalden, J. et al., "On the Complexity of Sphere Decoding in Digital Communications", IEEE Transactions on Signal Processing, vol. 53, No. 4, Apr. 2005, pp. 1474-14844.

Hansen, N. et al., "Evaluating the CMA Evolution Strategy on Multimodal Test Functions", Parallel Problem Solving from Nature, PPSN VIII, Xin Yao et al., editors, Springer, 2004, pp. 282-291.

Platel, M.D., et al., "Quantum-Inspired Evolutionary Algorithm: A Multimodel EDA", IEEE Transactions on Evolutionary Computation, Mar. 2008;pp. 1-15.

Simon, D., "Biogeography-Based Optimization", IEEE Transactions on Evolutionary Computation, vol. 12, No. 6, Dec. 2008, pp. 702-713.

Wolniansky, P.W. et al., "V-Blast: An Architecture for Realizing Very High Data Rates Over the Rich-Scattering Wireless Channel", IEEE, 1998, pp. 295-300.

Alamouti, Siavash M., "A Simple Transmit Diversity Technique for Wireless Communications", IEEE Journal on Select Areas in Communications, vol. 16, No. 8, Oct. 1998, pp. 1451-1458.

Viterbo, Emanuele et al., "A Universal Lattice Code Decoder for Fading Channels", IEEE Transactions on Information Theory, vol. 45, No. 5, Jul. 1999, pp. 1639-1642.

Bengoetxea, Endika, "Inexact Graph Matching Using Estimation of Distribution Algorithms", Dec. 2002, pp. 1-217.

\* cited by examiner

EDA-BASED DETECTION OF COMMUNICATION SIGNALS

CROSS-REFERENCE TO RELATED APPLICATIONS

This application claims the benefit under 35 U.S.C. §119 of U.S. patent application No. 61/129,328 filed 19 Jun. 2008 and entitled METHOD OF USING ESTIMATION OF DISTRIBUTION ALGORITHMS FOR DETECTING SPACE TIME BLOCK CODED SIGNALS and U.S. patent application No. 61/193,567 filed on Dec. 8, 2008 both of which are hereby incorporated herein by reference.

TECHNICAL FIELD

The invention relates to data communication, in particular, data communication in which signals encoded as code words are received at a receiver. In some embodiments the signals are space time block encoded. Embodiments provide multiple-input-multiple output (MIMO) communication systems.

BACKGROUND

There are many contexts in which it is necessary to retrieve information from signals measured or received at a receiver. The measured or received signals can be corrupted by noise or interfering signals. For example, the receiver in a digital communication system must determine which symbol or which sequence of symbols has been transmitted by a transmitter on the basis of the received signals, which contain noise and/or interference. At the receiver, all of the different symbols or sequences of symbols that could possibly have been transmitted to result in the received signal can be considered to be distinct hypotheses. The receiver (or a detection module at the receiver) must choose the one of these hypotheses that is most likely or that agrees with other performance criteria. A difficulty in such signal detection is that the number of possible signals (the number of hypotheses) is so large that finding the best hypotheses can be computationally burdensome.

Multiple-input-multiple-output (MIMO) communication systems can provide significantly higher channel capacity than comparable single-input-single-output systems having comparable total transmission power and bandwidth. In wireless communications, MIMO systems have the ability to deal with multipath propagation.

The use of Space Time Block Coding (STBC) can realize increased capacity in MIMO systems and thus improve data throughput and spectral efficiency. STBC and its applications are described, for example in:

Chau Yuen et al., *Quasi-orthogonal Space-time Block Code* vol. 2 of Communications and Signal Processings, Imperial College Press 2007 ISBN: 978-1-86094-868-8;

Vahid Tarokh et al. *Space-Time Block Coding for Wireless Communications: Performance Results*, IEEE Journal on Selected Areas in Communications, Vol. 17, No. 3, March 1999 p. 451;

Sumeet Sandhu et al., *Space-Time Block Codes: A Capacity Perspective*, IEEE Communications Letters, Vol. 4, No. 12, December 2000 p. 384;

Hamid Jafarkhani *Space-time coding: theory and practice*, Cambridge University Press, 2005 ISBN 0521842913, 9780521842914;

Georgios B. Giannakis et al., *Space-time coding for broadband wireless communications*, Wiley-Interscience, 2006 ISBN 0471214795, 9780471214793;

Helmut Bölcskei, et al., *Space-time wireless systems* Cambridge University Press, 2006 ISBN 052185105X, 9780521851053;

Ezio Biglieri, et al., *MIMO wireless communications*, Cambridge University Press, 2007, ISBN 0521873282, 9780521873284;

All of these references are hereby incorporated herein by reference.

STBC presents particular signal detecting challenges because, depending on the STBC implementation, the detector may be required to choose code words from a very large code book (which defines possible codes) for each block. Various technologies are available for detecting STBC signals. Existing technologies have various disadvantages.

The Maximum Likelihood (ML) detector provides optimal performance but requires a tremendous amount of processing at the receiver side. ML essentially involves computing a fitness function for all possible code words to find the code word that is most consistent with the received signals. ML can be undesirably costly to implement and/or slow.

A number of sub-optimal STBC detectors have been proposed. These detectors can be less computationally intensive than ML but suffer from various performance drawbacks, especially at low signal to noise ratio (SNR). Such STBC detectors include:

Zero Forcing (ZF);
Minimum Mean Square Error (MMSE),
Genetic Algorithm Detector (GAD),
Vertical Bell Laboratories Layered Space Time (V-BLAST); and
Sphere Decoder (SD).

Zero Forcing, and Minimum Mean Square Error are described, for example in H. Jafarkhani, *Space-Time Coding: Theory and Practice*, Cambridge University Press, 2005. A Genetic Algorithm Detector (GAD) based STBC-MIMO detector is described in Y. Du et al. *Improved Multiuser Detector Employing Genetic Algorithm in a Space-Time Block Coded System*, EURASIP J. of Applied Signal Processing, pp. 640-648, 2004. A drawback of GAD is that it requires several parameter values to be fine tuned to achieve good results. Also, in GAD it is difficult to predict the evolution of the population. Good blocks can be broken by the effect of crossover operators. V-BLAST is described for example in Foschini, G. J, *Layered space-time architecture for wireless communication in a fading environment when using multiple antennas*, Bell Lab. Tech. J., vol. 1, No. 2, pp. 41-59, 1996.

Sphere decoders are described in:

O. Damen, et al., *Lattice code decoder for space-time codes*, IEEE Comm. Let., vol. 4, no. 5, pp. 161-163, May 2000;

B. Hassibi et al. *On the sphere decoding algorithm: Part I, the expected complexity*, IEEE Transactions on Signal Processing, vol. 53, no 8, pages 2806-2818, August 2005;

B. Hassibi et al. *On the sphere decoding algorithm: Part II, generalizations, second-order statistics and applications to communications*", IEEE Transactions on Signal Processing, vol 53, no 8, pages 2819-2834, August 2005; and Jalden, J. et al., *On the Complexity of Sphere Decoding in Digital Communications*, IEEE Transactions on Signal Processing, vol. 53, no 4, pages 1474-14844, April 2005.

A need exists for receivers and receiving methods that have low computational complexity and/or better performance than existing receivers. There is a particular need for such receivers capable of operating with acceptable performance at low SNR. There is a particular need for such receivers capable of decoding STBC signals.

SUMMARY OF THE INVENTION

This invention provides methods and apparatus for detecting information in received signals. The invention has application inter alia in detecting information from received STBC signals. The invention may be embodied, for example, in receivers and methods for receiving STBC signals.

Some embodiments provide methods and apparatus for detection of information in received signals using Estimation of Distribution Algorithms (EDAs). In some embodiments the EDAs are configured to prevent premature convergence to local optimums. In some embodiments an EDA is applied to determine values for some elements of source (user) data and a Selective Local Search (SLS) is applied to determine values for other elements of the source data.

One aspect of the invention provides methods for receiving data. The data may be space-time-frequency block coded data, for example. The methods comprise receiving a set of signals carrying a transmitted data sequence, obtaining an initial possible solution set comprising a plurality of possible data sequences and making the initial possible solution set a current possible solution set. The methods construct a fitness function based on the received set of signals and determine a fitness of each of the possible data sequences in the current possible solution set using the fitness function. The methods identify a fittest subset of the plurality of possible data sequences in the current possible solution set for which the fitnesses are best and, based on the fittest subset, establish a probability distribution. The probability distribution comprises a set of probability values. Each of the probability values may correspond to a possible value of an element of the transmitted data sequence. The method proceeds by constructing one or more additional possible data sequences consistent with the probability distribution and creating a new current possible solution set including at least the additional possible data sequences. The methods iterate until a termination condition is satisfied.

Another aspect of the invention provides methods for receiving space time frequency block coded (STFBC) data. Methods according to this aspect comprise receiving a set of signals carrying STFBC data, obtaining an initial possible solution set comprising a plurality of possible data sequences and making the initial possible solution set a current possible solution set. A fitness function is constructed based on the received set of signals. A fitness of each of the possible data sequences in the current possible solution set is determined using the fitness function. On the basis of the current possible solution set and the corresponding fitness values, the methods establish a probabilistic or semi-probabilistic rule by which the current set of possible solutions is transformed to another set of possible solutions. On the basis of the current set of possible solutions and the probabilistic rule a new set of possible solutions is generated. The methods iterate until a termination condition is satisfied.

Another aspect of the invention provides data receivers comprising a plurality of antennas; signal detectors for detecting signals received at the antennas; and a data detection module. The data detection module is connected to receive the detected signals and configured to: construct a fitness function based on the received set of signals; and generate additional possible solution sets. The solution sets generated by: a) determining a fitness of each of the possible data sequences in the current possible solution set using the fitness function; b) identifying a fittest subset of the plurality of possible data sequences in the current possible solution set for which the fitnesses are best; c) based on the fittest subset, establishing an estimated probability distribution, the probability distribution comprising a set of probability values, the probability values corresponding to possible values for elements of the source data sequence; and d) constructing one or more additional possible data sequences consistent with the estimated probability distribution; and e) creating a new current possible solution set including at least the additional possible data sequences. The data detection module configured to iterate a) through e) until a termination condition is satisfied.

Another aspect of the invention provides data receivers comprising a plurality of antennas; signal detectors for detecting signals received on the antennas; a data detection module connected to receive the detected signals and configured to process the detected signals according to an Estimation of Distribution Algorithm to yield a received data sequence; and a data output.

Further aspects of the invention and features of specific embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. For example, certain known details of construction of receivers for STBC signals and known details of methods for receiving and detecting STBC signals are not described herein. Such details are known to those of skill in the field and are described in the relevant literature (for example the publications identified above in the Background section) and there is no need to repeat them here. Accordingly, the specification and drawings are to be regarded in an illustrative, rather than a restrictive, sense.

Figure 1:
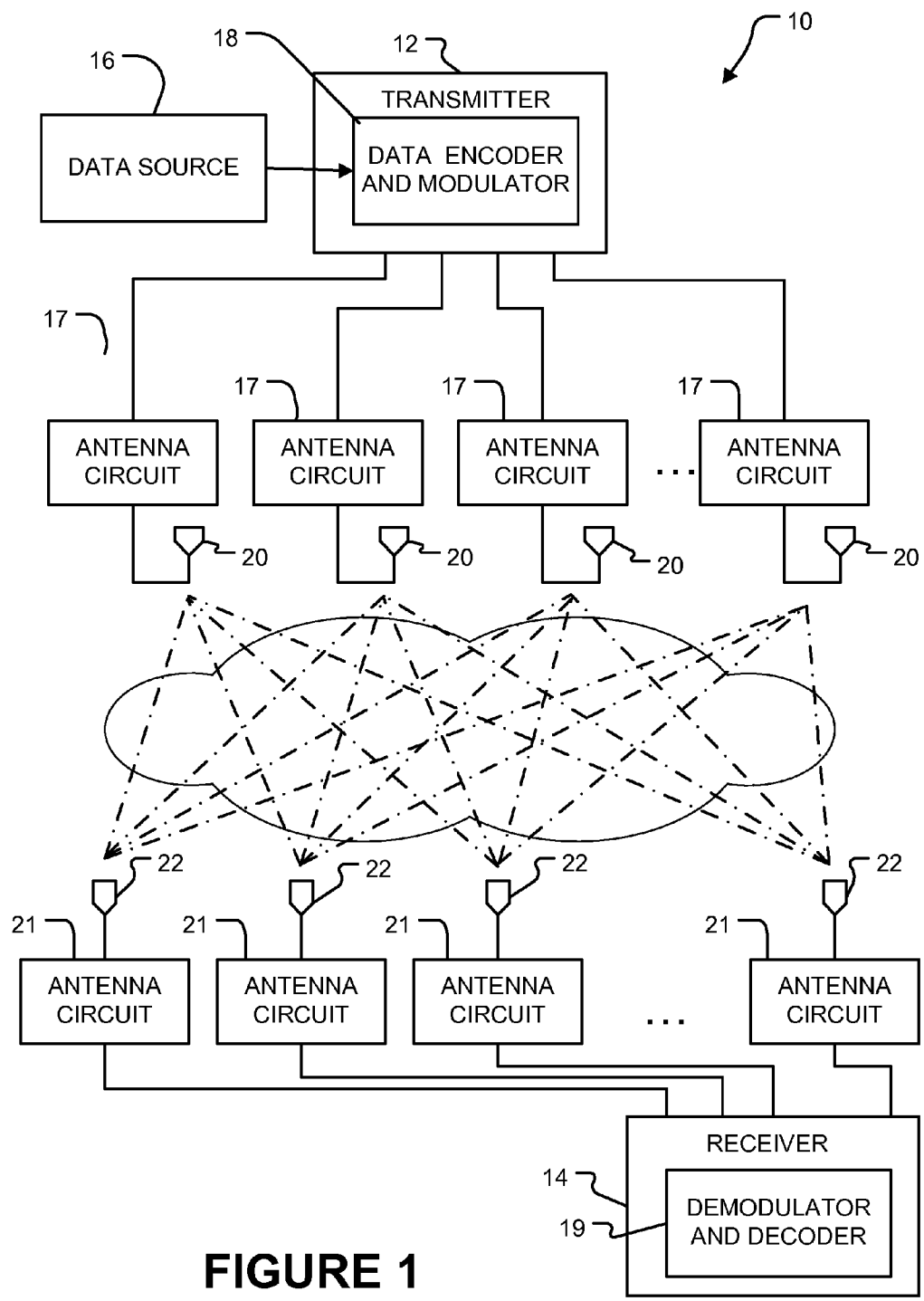
FIG. 1 is a block diagram of a data transmission system according to an example embodiment.

FIG. 1 shows a general communication system 10 comprising a transmitter 12 and a receiver 14. At transmitter 12, data from a data source 16 is modulated by a data modulator 18. Transmitter 12 comprises a plurality of antennas 20.

Transmitter 20 has T antennas 20. Data modulator 18 receives a stream of data to be transmitted (a source data sequence) and maps the data to code words that can be transmitted by antennas 20.

Receiver 14 receives the signals transmitted by transmitter 12. A decoder 19 recovers the transmitted data from the received signals. Receiver 14 has R receive antennas 22. In the simplest case T=1 and R=1. However, system 10 may have more than one transmit antenna 20 and more than one receive antenna 22. Where system 10 has multiple transmit antennas 20 and multiple receive antennas 22 system 10 may be configured as a multiple-input, multiple output (MIMO) communication system.

Decoder 19 determines which code word(s) has been transmitted by transmitter 12 on the basis of the received signal(s). System 10 as depicted in FIG. 1 can represent a system that employs coding across space (coding across different transmit antennas), coding across time, coding across frequency (e.g., coding across signals carried at different carrier frequencies as in orthogonal frequency modulation schemes), or any combinations of these coding schemes such as space-time-frequency coding, space-time coding, frequency-time coding, space-frequency coding, etc.

In the case of a space-time coding, transmitter 12 may take a block of data to be transmitted and determine a symbol to be transmitted by each of antennas 20 for each of a plurality of time periods. Receiver 14 receives resulting signals at antennas 22 and attempts to recover the block of data from the received signals.

In system 10, transmitter 12 comprises optional antenna circuits 17 and receiver 14 comprises optional antenna circuits 21. Antenna circuits 17 and/or 21 may optionally be applied to control a selection of antennas used to transmit and receive signals as described in more detail below.

Let us consider a mathematical representation of a general system, which can even employ a spacetime-frequency coding. In this discussion, symbols are defined as set out in Table I.

TABLE I

| | Symbol Definitions |
|---|---|
| $T_S$ | number of symbols (time slots) in a time block |
| $N_C$ | number of carriers in the space-time-frequency coded system. The carriers are typically at different frequencies. |
| $\phi$ | an index with $\phi \in \{1, 2, \ldots, N_C\}$ identifying a carrier of the space-time-frequency coded system |
| $H(\phi)$ | the T × R complex-valued matrix representing the gains of the channels from transmit antennas 20 to receive antennas 22 at the $\phi^{th}$ carrier frequency |
| $S(\phi)$ | the $T_S$ × T complex-valued matrix representing signals transmitted at the $\phi^{th}$ carrier frequency at transmit antennas 20 during a time block. |
| $Y(\phi)$ | the $T_S$ × R complex-valued matrix representing the portion of signal received by all the R receive antennas 22 at the $\phi^{th}$ carrier frequency during a time block |
| $Z(\phi)$ | the T × R complex-valued matrix representing the noise on the channels from transmit antennas 20 to receive antennas 22 at the $\phi^{th}$ carrier frequency |
| $\overline{Y}$ | is a $T_S$ × $RN_C$ complex-valued matrix obtained by concatenating $Y(\phi)$ for all values of $\phi$ |
| $\overline{S}$ | is a $T_S$ × $TN_C$ complex-valued matrix obtained by concatenating $S(\phi)$ for all values of $\phi$ |
| $\overline{Z}$ | is a $T_S$ × $RN_C$ complex-valued matrix obtained by concatenating $Z(\phi)$ for all values of $\phi$ |
| $\hat{H}$ | is a block diagonal $TN_C$ × $RN_C$ matrix obtained from $H(\phi)$ |
| $\mathbb{C}$ | is the set of code words that can be transmitted by transmitter 12 |

The entry at the $i^{th}$ row and the $j^{th}$ column of $H(\phi)$ represents the gain of the channel from the $i^{th}$ transmit antenna 20 to the $j^{th}$ receive antenna 22 for the $\phi^{th}$ carrier. The entries of $H(\phi)$ may be determined in ways known to those in the art, for example, by transmitting and receiving one or more predetermined training sequences. The entry at the $i^{th}$ row and the $j^{th}$ column of $Y(\phi)$ represents the signal received by the $j^{th}$ receive antenna 22 at the $i^{th}$ one of the $T_S$ time slots of the time block. The entry at the $i^{th}$ row and the $j^{th}$ column of $S(\phi)$ represents the signal transmitted in the $i^{th}$ time slot by the $j^{th}$ transmit antenna 22 for the $\phi^{th}$ carrier. The entry at the $i^{th}$ row and the $j^{th}$ column of $Z(\phi)$ represents the noise on the channel from the $i^{th}$ transmit antenna 20 to the $j^{th}$ receive antenna 22 for the $\phi^{th}$ carrier.

A space-time-frequency codeword can be represented by a collection of the matrices $S(\phi)$ for each of the $N_C$ carriers. The communication system can thus be modeled by the system of $N_C$ matrix equations:

$$Y(\phi)=S(\phi)H(\phi)+Z(\phi), \phi=1, 2, \ldots, N_C \quad (1)$$

The relationship of Equations (1) can also be represented as:

$$\overline{Y}=\overline{S}\hat{H}+\overline{Z} \quad (2)$$

Some parameter values that correspond to specific embodiments are listed in Table 2.

TABLE 2

| Special Cases for specific embodiments | |
|---|---|
| $N_C = 1$ | space-time coding |
| $T = R = 1$ | may have time and/or frequency coding |
| $T > 1$ and $R > 1$ | may be operated as a MIMO system |
| $T_S = 1$ | may have space and/or frequency coding |
| $T = 1, R \geq 1$ | may have time and/or frequency coding |

It is known in advance that any code word S transmitted by transmitter 12 belongs to set $\mathbb{C}$. The signal detection task to be performed by receiver 14 is to decide which code word of set $\mathbb{C}$ has been transmitted on the basis of the received signal $\overline{Y}$. Suppose that receiver 14 has received a particular signal $\overline{Y}=y$. Let us denote by $\hat{s}(y)$ the code word that the receiver chooses based on the received signal y. $\hat{s}(y)$ is a function of y and embodies a detection rule applied by the receiver 14. For a wide class of systems and performance criteria, the optimal detection rule is given by:

$$\hat{s} = \arg\max_{s \in C} F_y(s) \quad (3)$$

where $F_y(\ )$ is a real-valued function associated with each possible received signal y, the domain of function $F_y$ is $\mathbb{C}$ and argmax is the argument of the maximum (i.e. the set of values for s that result in $F_y$ having the maximum value).

The particular function $F_y(\ )$ implemented in a specific embodiment may be chosen based on a system performance criterion. For example, if the performance criterion is to maximize the probability that receiver 14 will correctly identify the code word transmitted by transmitter 12 (i.e. minimizing the probability of making an error), the function $F_y(\ )$ may be given by:

$$F_y(s) = P[s|Y=y] \quad (4)$$

where $P[s|Y=y]$ denotes the conditional probability that the transmitter has transmitted code word s conditioned on the event that the receiver receives signal y. The optimal decision rule is known as the maximum a posteriori (MAP) detection rule.

The MAP detection rule is given by:

$$\arg\max_{s \in C} F_y(s) = \arg\max_{s \in C} P[s|Y=y] \quad (5)$$

In cases where it is given that the a priori probability for each code word is the same, the MAP detection reduces to the maximum likelihood (ML) given by:

$$\arg\max_{s \in C} F_y(s) = \arg\max_{s \in C} P[Y=y|s] \quad (6)$$

A difficulty in implementing the optimal detection rule is that C may have a very large number of elements. For example, if a particular communication system uses code words that each contain $N_B$ user symbols and the system employs M-ary modulation, then the number of code words is $|\mathbb{C}| = M^{N_B} = 2^{bN_B}$, where b is the number of bits per user symbol and $|\mathbb{C}|$ denotes the size of set $\mathbb{C}$. The size of set $\mathbb{C}$ in this example grows exponentially with $N_B$. An exhaustive search for the value of s satisfying Equation (5) would be computationally burdensome for larger values of $N_B$.

Certain embodiments of the invention (for example, the embodiment illustrated in FIG. 2) apply an Estimation of Distribution Algorithm (EDA) for the detection of information in received signals. EDAs are population based search algorithms that perform probabilistic modeling to locate potential solutions. In EDAs new potential solutions are generated according to a probability distribution of good solutions from a previous iteration. In estimating the probability distribution, the interdependence of variables can remain intact. Thus, EDAs can work well even in cases where there are interactions among variables.

Figure 3:
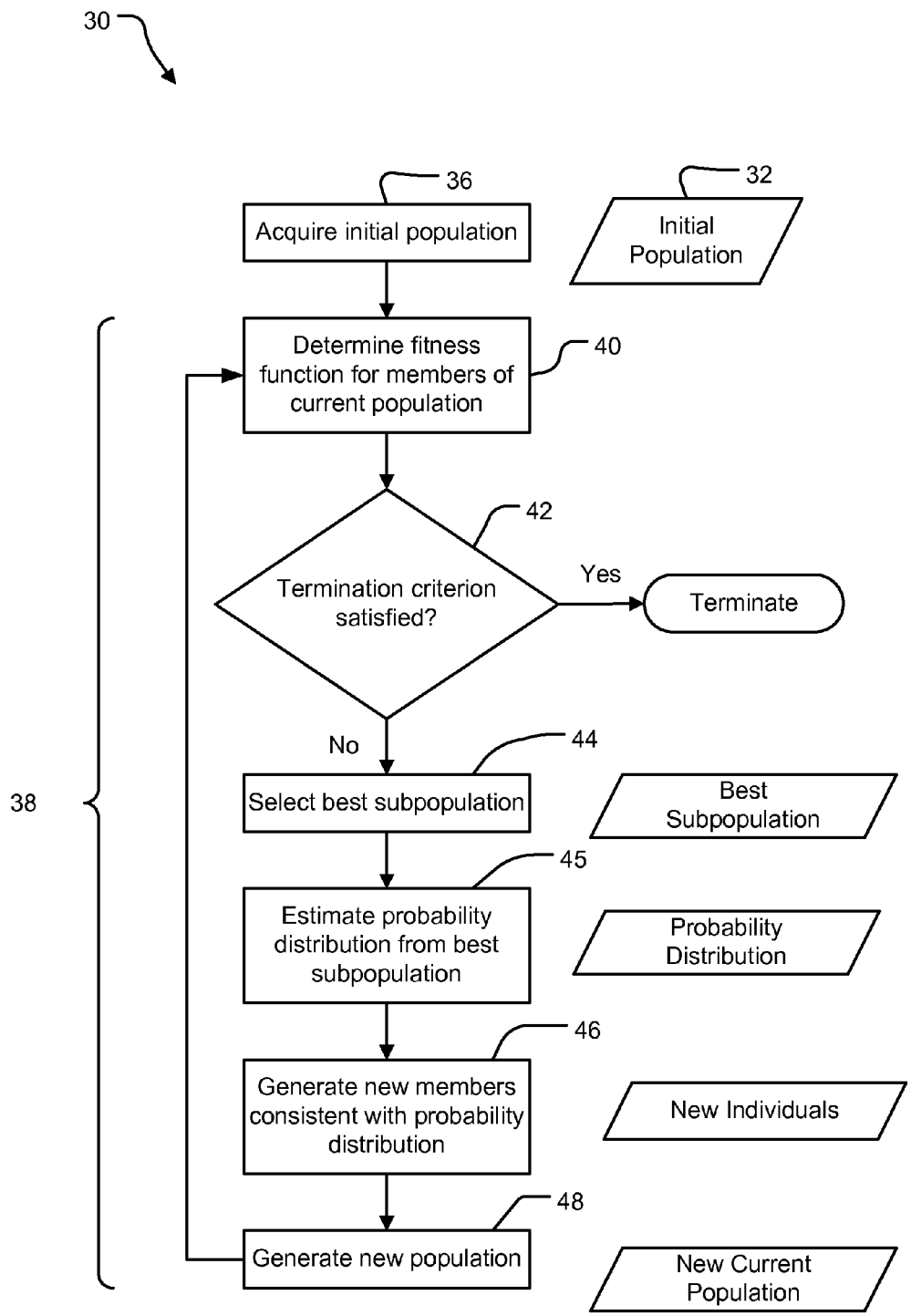
FIG. 3 is a flow chart illustrating the application of an EDA to detect STBC signals.

FIG. 3 is a flow chart for a method 30 that illustrates the application of an EDA to detect STBC signals. An EDA may be characterized by the parameters listed in Table 3.

TABLE 3

| | EDA Parameters |
|---|---|
| I | the space of all potential solutions (entire search space of individuals). |
| F | a fitness function |
| $\Delta_l$ | the size of population generated at iteration l. For simplicity the same number $\Delta_l$ may be used for all iterations. This is, we often set $\Delta_l = \Delta$, $\forall l$. |
| $\eta_l$ | the number of best candidate solutions selected from $\Delta_l$ individuals for iteration l. For simplicity the same number $\eta_l$ may be used for all iterations. This is, we often set $\eta_l = \eta$, $\forall l$. |
| $\rho_l$ | the ratio $\eta_l/\Delta_l$ which may be called the selection probability (fraction) at iteration l. For simplicity the same selection probability may be used for all iterations. |
| $D_l$ | the distribution estimated from the best candidate solutions from the previous iteration (i.e. $\eta_{l-1}$). |
| $F_{Ter}$ | a termination criterion or set of criteria (termination condition) |

To use EDA for extracting encoded information from communication signals one can set I to be the set $\mathbb{C}$ of all hypotheses a defined above. The fitness function may be set to be $F_y(\ )$. In some embodiments distinct elements in $\mathbb{C}$ are represented as distinct integer vectors. For example, the members of $\mathbb{C}$ may be represented by binary vectors or vectors of integers in some embodiments.

Method 30 acquires an initial population 32 of test solutions (individuals) in block 36. This initial population may be termed a possible solution set. The individuals may be called 'possible data sequences'. Block 36 may comprise generating test solutions randomly, for example, by drawing individuals from set $\mathbb{C}$ with equal probability, taking a predetermined initial population of test solutions, or the like. In some embodiments one or more good candidate test solutions are generated by applying a low complexity algorithm, e.g., ZF, MMSE or V-BLAST. These candidates may be used as an initial population 32. Preferably these candidates are augmented by the addition of a random population.

In this example, each candidate solution is represented as an integer string of length n, and each element of a candidate solution has an integer value in a defined range.

Method 30 performs iterations of a sequence 38. Each iteration produces a new population of test solutions. In this example, each population comprises a set of vectors $X^A$ where A, $1 \leq A \leq \Delta_l$ is an index representing a particular one of the $\Delta_l$ vectors in the population after iteration l. Each of the vectors has elements $x^A_1$ to $x^A_n$.

In block 40, the value of the fitness function for each member of the current population is determined.

Block 42 determines whether a termination criterion is satisfied. The termination condition may, for example, consider one or more of:
  a value of the fitness function for the best member of the current population,
  a number of iterations that have been completed,
  the number of members of the current population that were present in one or more previous populations.
For example, the termination condition may be satisfied if the value of the fitness function for the best member of the current population exceeds a threshold value or more than a certain number of iterations has been completed.

In other embodiments the termination condition may take into account the rate at which the fitness of the population is converging (increasing). The rate of convergence may, for example, be based upon the difference between the value of the fitness function for the best member of the current population and the values of the fitness function for the best members of the populations for one or more previous iterations. For example, a termination condition may be satisfied if either: the fitness function for the best member of the current population exceeds a threshold value; or more than a certain number of iterations has been completed and the rate of convergence is lower than a threshold rate of convergence.

If block 42 determines that the termination condition is satisfied then the best member of the current population is taken to represent the received data sequence. In other embodiments, the best member of the current population is compared to the best member or best members of previous populations and the best of these is taken to represent the received data sequence. For example, the best members of all populations generated in all iterations from the initial population to the current iteration may be kept in memory and the best member of all of these may be taken to represent the data sequence. In other embodiments, the best member in each iteration is automatically included in the population for the next iteration. In other embodiments, a best member is updated at each iteration. If block 42 does not determine that the termination condition is satisfied then method 30 continues at block 44 which selects the best $\eta_{l-1}$ members of the current population (based upon the corresponding values for the fitness function). Block 44 may comprise, for example, sorting the current population according to the corresponding fitness function values.

In block 45 a probability distribution is estimated from the best individuals identified in block 44. The probability distribution may, for example, be given by:

$$p(\theta_1, \theta_2, \ldots, \theta_n) = P[x_1 = \theta_1, x_2 = \theta_2, \ldots, x_n = \theta_n] \quad (7)$$

For example, consider the set of binary vectors in the left column of Table 4 that could constitute a set of best individuals at some iteration of a method as described herein.

TABLE 4

Example Vectors

| | | | | |
|---|---|---|---|---|
| 11100...011 | 11111...011 | 11100...011 | 10101...011 | 11101...011 |
| 11101...010 | 01100...011 | 10111...011 | 10100...010 | 01100...011 |

In this example, the probability that the first element of the vector has the value 1 is 0.8 (since 8 of the ten example vectors have a first element having a value of 1). The probability distribution for this example can be given by: 0.8, 0.7, 1.0, 0.2, 0.5, ..., 0.0, 1.0, 0.8.

In some embodiments the estimated probability distribution has a representation as a collection of sub-distributions. Each of the sub-distributions is associated with a subset comprising one or more components in a vector representation of valid source data sequences. The sub-distributions may each include a set of probability values that correspond to specific values of the components of the associated subset.

In block 46, new members are generated in a manner that is consistent with the probability distribution determined in block 45. For example, a probability distribution computed for the set of new individuals generated in block 46 may be the same as, or substantially the same as, the probability distribution determined in block 45. The new individuals may be generated in any suitable manner. By way of illustration only, in some embodiments the new individuals are generated randomly or quasi-randomly. In some embodiments the new individuals are generated by making random or quasi-random variations to individuals of the current population. the variations may be made according to a probabilistic or semi-probabilistic rule, for example. Such a rule may be generated based upon the probability distribution determined in block 45, for example.

Block 46 may comprise, for example, generating replacements for all of the $\Delta$-$\eta$ members of the current population not identified as being best in block 44. It is generally desirable that the ratio $\eta:\Delta$ be neither very close to 1 or very close to zero. In either case, the rate of convergence may be undesirably slow and/or the chance that a local optimum will be produced may be undesirably high. In some embodiments, $\eta:\Delta$ is in the range of 1:10 to 9:10.

Block 48 creates a new population of individuals. Block 48 may comprise, for example, combining new individuals generated in block 46 with some or all of the best individuals identified in block 44. In some embodiments, the new population includes all of the best individuals identified in block 44 and the new individuals generated in block 46. The new population preferably includes the best individual identified in block 44.

Method 30 then completes the iteration of sequence 38 by continuing to block 42.

Method 30 may be varied in many ways. For example, a convenient way to estimate the probability distribution in block 45 is to perform the following calculation or an equivalent thereof:

$$p(\theta_1, \theta_2, \theta_3, \ldots, \theta_n \mid I_{l-1}^\eta) = \prod_{i=1}^n p(\theta_i \mid I_{l-1}^\eta) = \prod_{i=1}^n \frac{\sum_{j=1}^{\eta_{l-1}} \delta(x_i^j = \theta_i \mid I_{l-1}^\eta)}{\eta_{l-1}} \quad (8)$$

where $\delta$ is an indicator function that can be expressed as:

$$\delta(x_i^j = \theta \mid I_{l-1}^\eta) = \begin{cases} 1 & \text{if } x_i^j = \theta \\ 0 & \text{otherwise} \end{cases} \quad (9)$$

Methods that apply Equation (8) are examples of methods that estimate the marginal probability distribution by the relative frequency counted from the individuals. The joint distribution is obtained from the marginal distributions in the product form. Therefore, in accordance with the estimation of distribution in this method, the variables $x_1, x_2, x_3, \ldots, x_n$ are assumed to be statistically independent.

It is not necessary that the variables $x_1, x_2, x_3, \ldots, x_n$ are statistically independent. The probability distribution may be estimated under an assumption more relaxed than all variables being statistically independent. For example, the probability distribution may be estimated by:

$$p(\theta_1, \theta_2, \theta_3, \ldots, \theta_n \mid I_{l-1}^\eta) \approx \prod_{k=1}^{m} p_k(\theta_{i(k)}, \theta_{i(k)+1}, \ldots, \theta_{i(k)+d(k)-1} \mid I_{l-1}^\eta) \approx \quad (10)$$

$$\prod_{i=1}^{n} \left[ \frac{\sum_{j=1}^{\eta_{l-1}} \delta((x_{i(k)}^j, x_{i(k)+1}^j, \ldots, x_{i(k)+d(k)-1}^j) = (\theta_{i(k)}, \theta_{i(k)+1}, \ldots, \theta_{i(k)+d(k)-1}) \mid I_{l-1}^\eta)}{\eta_{l-1}} \right]$$

In equation (10), $p_k$ denotes the joint probability distribution of $d(k)$ random variables $x_{i(k)}{}^j, x_{i(k)+1}{}^j, \ldots, x_{i(k)+d(k)-1}{}^j$ where $i(1)=1$ and $i(k+1)=i(k)+d(k)$, $k=1, 2, \ldots, m$ and $i(m)+d(m)-1=n$. In equation (10) the function $\delta(\ )$ is given by:

$$\delta((x_{i(k)}^j, x_{i(k)+1}^j, \ldots, x_{i(k)+d(k)-1}^j) = \quad (11)$$
$$(\theta_{i(k)}, \theta_{i(k)+1}, \ldots, \theta_{i(k)+d(k)-1}) \mid I_{l-1}^\eta) \equiv$$
$$\begin{cases} 1 & \text{if } (x_{i(k)}^j, x_{i(k)+1}^j, \ldots, x_{i(k)+d(k)-1}^j) = (\theta_{i(k)}, \theta_{i(k)+1}, \ldots, \theta_{i(k)+d(k)-1}) \\ 0 & \text{otherwise} \end{cases}$$

Methods which estimate the probability distribution in accordance with (10) and (11) can capture correlations among the variables better than methods which apply (8) and (9) at the expense of some extra computation.

In other embodiments correlations among $x_i$ are expressly taken into account. For example a covariance adaptation technique may be applied. An example of a covariance adaptation technique is described, for example, in Hansen N, et al., *Evaluating the CMA evolution strategy on multimodal test functions* in Parallel Problem Solving from Nature—PPSN VIII, Xin Yao et al., editors, pp. 282-291, Springer, 2004, which is hereby incorporated herein by reference.

In other embodiments, the probability distribution is estimated in block 45 by using other suitable techniques such as quantum evolutionary algorithms, cross-entropy algorithms, etc. A quantum evolutionary algorithm is described for example in M. D. Patel, et al. *Quantum-inspired evolutionary algorithm: a multimodel EDA*, IEEE Transactions on Evolutionary Computation.

In some embodiments, block 45 comprises smoothing changes in the probability distribution from one iteration to the next. This may be achieved by computing an average, which may comprise a weighted average, of the probability distribution over two or more iterations. For example, in some embodiments, the probability distribution is calculated according to:

$$D_l = \alpha D_{l-1} + (1-\alpha) P(\theta_1, \theta_2, \theta_3, \ldots, \theta_n \mid I_{l-1}^\eta), 0 \leq \alpha < 1 \quad (12)$$

In this example, the degree of smoothing may be controlled by varying the parameter $\alpha$.

Some embodiments include adaptations that reduce the likelihood that an EDA may become stuck in a local optimum due to premature convergence of the probability mass to a particular point in the domain of the distribution or that the EDA will not converge in a reasonable number of iterations. One such adaptation prevents probability values in the probability distribution determined in block 45 from achieving deterministic values (i.e. values representing probabilities of zero or certainty). This may be achieved in a wide variety of ways such as:
  clamping the probabilities so that they cannot exceed, fall below, or exceed or fall below some set threshold levels;
  mapping probabilities by applying one or more mapping functions that map to values that exclude deterministic values;
  salting the current population with random or pre-determined individuals before estimating (or re-estimating or revising the estimate of) the probability distribution;
  etc.

Figure 4:
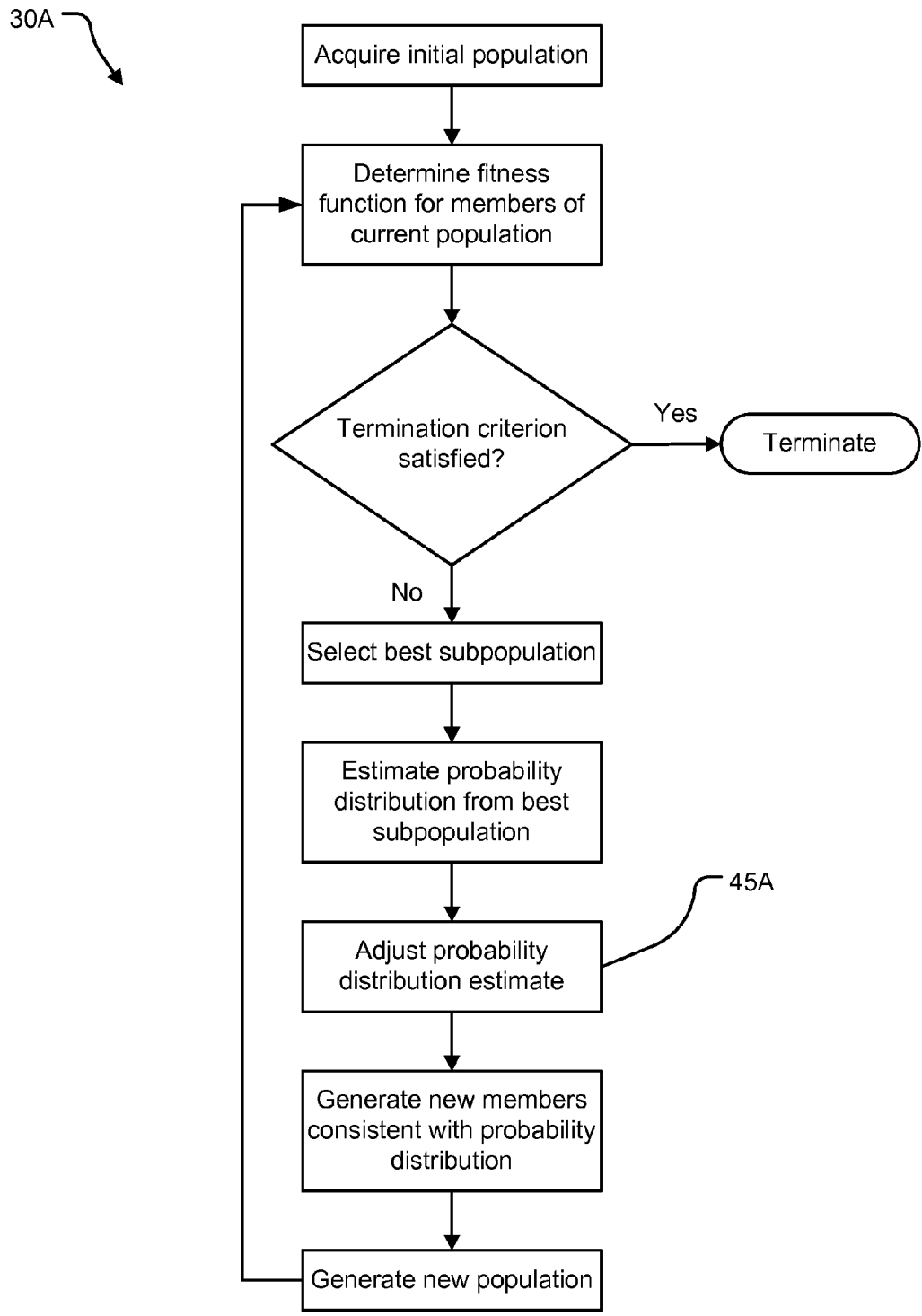
FIG. 4 is a flow chart illustrating a method for detecting STBC signals comprising applying a modified EDA.

FIG. 4 shows a method 30A according to a specific example embodiment. Consider the case where each individual in set $\mathbb{C}$ comprises a binary vector having elements $x_1$ to $x_n$. The binary marginal distributions associated with the estimated probability distribution $D_l$ may be expressed in the notation:

$$p_i = P(x_i = 1 \mid I_{l-1}^\eta) = P(1 \mid I_{l-1}^\eta) = 1 - P(0 \mid I_{l-1}^\eta), i = 1, 2, \ldots, n \quad (13)$$

Any of $p_i$ could converge prematurely to a probability of 0 or 1. To discourage such premature convergence, at some or all iterations, after estimating $p_i$ the set of $p_i$ is adjusted. Such an adjustment is indicated by block 45A of the method 30A shown in of FIG. 4. The adjustment ensures that some degree of randomness remains in the algorithm until the termination criterion is satisfied. Method 30A may be the same as or similar to method 30 with the exception of adjustment block 45A.

In some embodiments, adjustment is performed conditionally based on comparisons of the probability values $p_i$ to thresholds. First, consider the problem of preventing a probability value $p_i$ from prematurely converging to 1. The probability value may be compared to a threshold $\gamma$. If $p_i > \gamma$ (or equivalently if $p_i \geq \gamma$) the value of $p_i$ may be reduced. For example: the value of $p_i$ may be replaced with $\gamma$; a predetermined amount may be subtracted from $p_i$; $p_i$ may be multiplied by some fraction; or the like. In some embodiments, each probability value is compared to the same upper threshold $\gamma$. In other embodiments, separate thresholds are specified for different probability values. It is desirable that $\frac{1}{2} \leq \gamma < 1$.

Now consider the problem of preventing a probability value $p_i$ from prematurely converging to 0. The probability value may be compared to a lower threshold $\beta$. If $p_i < \beta$ (or equivalently if $p_i \leq \beta$) the value of $p_i$ may be increased. For example: the value of $p_i$ may be replaced with $\beta$; a predetermined amount may be added to $p_i$; $p_i$ may be multiplied by some value ($>1$); or the like. In some embodiments, each probability value is compared to the same lower threshold $\beta$. In other embodiments, separate lower thresholds are specified for different probability values. It is desirable that $0 < \beta < \frac{1}{2}$.

A simple way to adjust a joint probability distribution involves using the product form given by:

$$p_i^*(\theta_1, \theta_2, \ldots, \theta_n \mid I_{l-1}^\eta) = \prod_{i=1}^{n} p_i^*(\theta_i \mid I_{l-1}^\eta) \quad (14)$$

here, $p_i^*(\theta_1, \theta_2, \ldots, \theta_n \mid I_{l-1}^\eta)$ is the joint distribution adjusted from the estimated distribution $p_i$ $(\theta_1, \theta_2, \ldots, \theta_n \mid I_{l-1}^\eta)$ and $p_i^*(\theta_i \mid I_{l-1}^\eta)$ is the marginal distribution for the component $x_i$ adjusted, for example, as described above.

In embodiments where each individual in set $\mathbb{C}$ is represented by an integer (not necessarily binary) vector, similar techniques may be applied to avoid incorrect concentration of probability mass in a marginal distribution of a variable $x_i$. Suppose that a marginal distribution estimated for variable $x_i$ has a very high concentration of probability mass at some value of $x_i$, say $x_i = \theta$ for some $\theta$ (i.e. the probability of event $x_i = \theta$ is close to 1). Some embodiments comprise adjusting the marginal distribution so that the probability of event $x_i = \theta$ is sufficiently away from 1. For example, an upper threshold $\gamma_i$ that is less than but close to 1 may be provided. If $p_i(\hat{\theta}|I_{l-1}^\eta)>\gamma$ for some integer value $\hat{\theta}$ then the marginal distribution may be adjusted to reduce $p_i(\hat{\theta}|I_{l-1}^\eta)$. One example way in which this can be done is to perform the mappings:

$$p_i^*(\hat{\theta}|I_{l-1}^\eta) = \gamma_i \quad (15)$$

and $$p_i^*(\theta|I_{l-1}^\eta) = \frac{(1-\gamma_i)p_i(\theta|I_{l-1}^\eta)}{1 - p_i(\hat{\theta}|I_{l-1}^\eta)}, \forall \theta \neq \hat{\theta} \quad (16)$$

To avoid premature elimination of possible values for $x_i$ from consideration one can adjust small values of $p_i(\hat{\theta}|I_{l-1}^\eta)$ upwardly so that the event $x_i=\hat{\theta}$ has sufficient representation in newly created members of the population of test vectors. A simple embodiment provides a lower threshold $\beta$ where $\beta$ is some small non-zero value. If, for some value $\hat{\theta}$, $p_i(\hat{\theta}|I_{l-1}^\eta)<\beta$ then the marginal distribution may be adjusted. One way to achieve such adjustment is to perform the mappings:

$$p_i^*(\hat{\theta}|I_{l-1}^\eta) = \beta_i \quad (17)$$

and $$p_i^*(\theta|I_{l-1}^\eta) = \frac{(1-\beta_i)p_i(\theta|I_{l-1}^\eta)}{1 - p_i(\hat{\theta}|I_{l-1}^\eta)}, \forall \theta \neq \hat{\theta} \quad (18)$$

An adjusted joint distribution may then be determined from the adjusted marginal distributions.

In some embodiments individuals are weighted differently in estimating the joint probability distribution. Individuals having better fitness may be weighted more heavily than other individuals. In some embodiments the probability distribution is based on all of the individuals in the current population which are weighted according to their fitness. In an example of such an embodiment, the probability estimation is given by:

$$\Gamma = p(\theta_1, \theta_2, \ldots, \theta_n | I_{l-1}^\eta) = \prod_{i=1}^n \sum_{j=1}^{\eta_{l-1}} \omega_j \delta(x_i^j = \theta_i | I_{l-1}^\eta) \quad (19)$$

where $\delta$ is an indicator function given by:

$$\delta(x_i^j = \theta | I_{l-1}^\eta) = \begin{cases} 1 & \text{if } x_i^j = \theta \\ 0 & \text{otherwise} \end{cases} \quad (20)$$

and $\omega_j$ is the weight given to the individual indexed by j in selected set $\eta_{l-1}$. Preferably the weights are normalized such that $$\sum_{j=1}^{\eta_l} w_j = 1.$$

Weights $\omega_j$ may be determined in a wide variety of ways. In some embodiments, weights are updated at each iteration. For example, the weights may be calculated according to:

$$\omega_j = \frac{F(X^j)}{\sum_{k=1}^{\eta_l} F(X^k)}, j = 1, 2, \ldots, \eta_l \quad (21)$$

In other embodiments, weights are fixed. For example, predetermined weights may be assigned based upon the order of the individuals when sorted according to fitness. In one such embodiment, the weights to be assigned $\xi_j$ are set according to:

$$\xi_j = \frac{\log(\eta_l) - \log(j)}{\sum_{k=1}^{\eta_l} [\log(\eta_l) - \log(k)]}, j = 1, 2, \ldots, \eta_l \quad (22)$$

Note that in Equation (22), weights $\xi_j$ increase with index number j. One can assign these weights to individuals in accordance with the order of individuals in the population sorted by fitness.

Another example way to set weights $\xi_j$ is given by:

$$\xi_j = \frac{\eta_l - j}{\sum_{k=1}^{\eta_l} [\eta_l - k]}, j = 1, 2, \ldots, \eta_l \quad (23)$$

In some embodiments, a new population of individuals may be generated in whole or in part by adjusting individuals from the previous iteration. The adjustment may be random. Adjustments may be determined on the basis of the populations generated in past iterations. One example of such evolution through adjustment is a biogeography-based optimization (BBO) as described, for example in D. Simon, *Biogeography-based optimization*, IEEE Transactions on Evolutionary Computation, vol. 12, no. 6, December 2008, pp. 702-713, which is hereby incorporated herein by reference.

Figure 5:
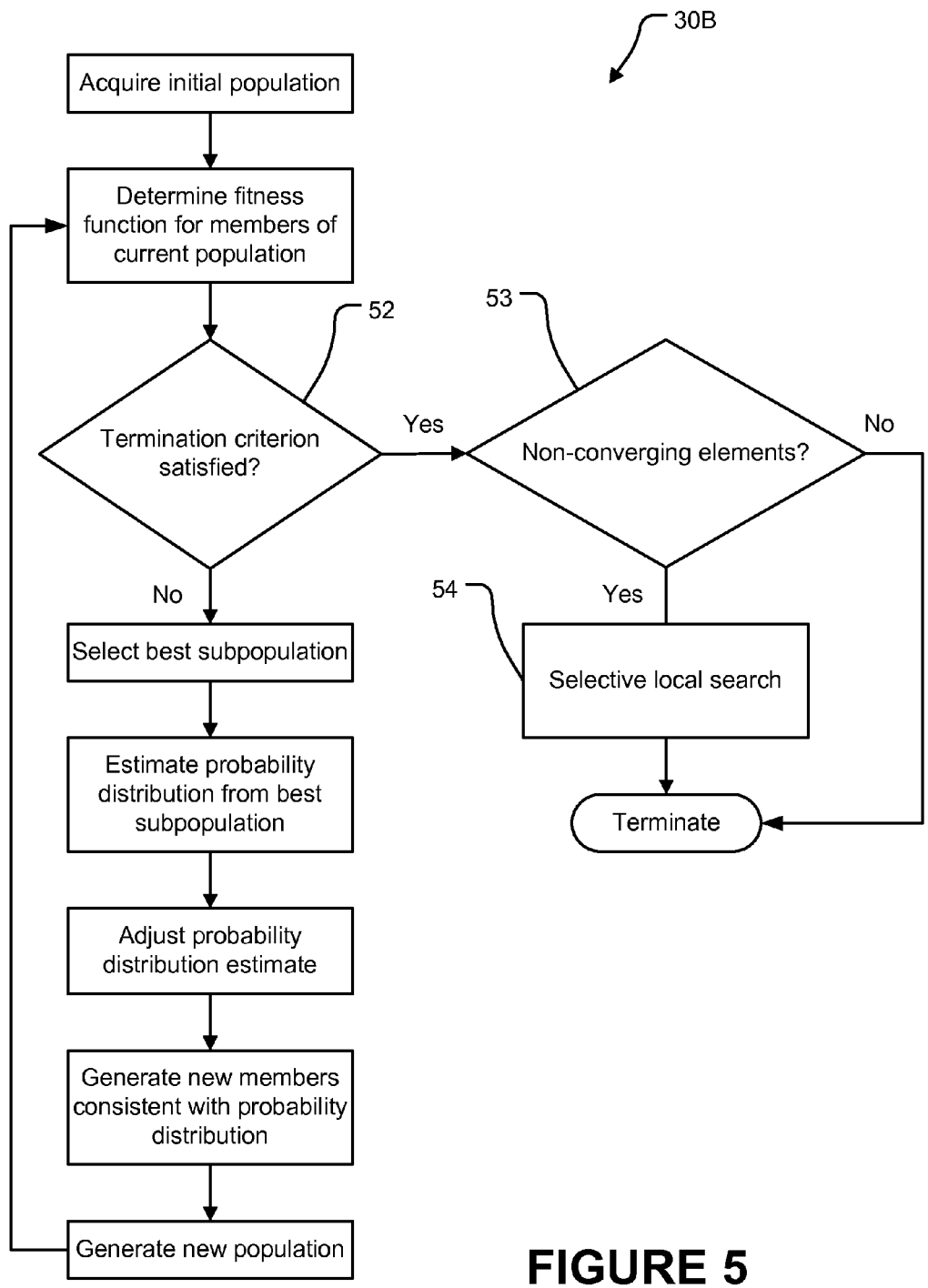
FIG. 5 is a flow chart illustrating a method for detecting STBC signals comprising applying a modified EDA and SLS.

In some embodiments an additional search is performed after a termination condition has been satisfied. FIG. 5 shows an example method 30B which performs such an additional search. Depending upon the termination condition, it may be the case that, even after the termination criterion is satisfied, some elements among $\{x_1, x_2, \ldots, x_n\}$ may not have dominant values in terms of their likelihood. Such values may be said not to have converged. For example, for element $x_i$, if $p(\theta|I_{l-1}^\eta)$ at the end of the last iteration is not sufficiently close to 1 for any value of $\theta$, then variable $x_i$ does not have a dominant value in terms of its likelihood.

Some such embodiments include a step of identifying elements that have not settled to a dominant value in terms of likelihood and a step of performing an exhaustive search which may be limited to those elements. Since the exhaustive search is performed on fewer than all elements, the complexity of the exhaustive search may be manageable. In some embodiments the termination condition comprises a determination that the number of elements that have not settled to a dominant value in terms of likelihood is fewer than some threshold number. In such embodiments the exhaustive search may be conducted for a number of elements that is equal to the threshold number or equal to the number of elements that have not settled to a dominant value in terms of likelihood according to some measure.

Consider the following illustration for the special case in which each individual in set $\mathbb{C}$ is represented by a binary vector $\{x_1, x_2, \ldots, x_n\}$. Suppose that some probability values among $p_1, p_2, \ldots, p_n$ have not shown convergence when the termination criterion of block 42 is satisfied. For example, suppose that none of $p_i$, $p_j$ and $p_k$ have converged to either $\gamma$ or $\beta$. One can denote by Nnc the number of non-converging probability values in the n-tuple. One can apply an exhaustive search on these Nnc bits. Such a search may be termed a selective local search (SLS). Where Nnc is very small as compared to n, it will not add any significant extra computational complexity to the system. Simulation results show that performance of EDA with SLS is better than EDA.

FIG. 5 shows a method 30C according to a specific example embodiment. After termination condition test 52 is found to be satisfied, block 53 determines whether any elements are non-converging. Where each individual in set $C$ is represented by a non-binary vector $\{x_1, x_2, \ldots, x_n\}$, determining whether any elements are non-converging may comprise, for example, determining a probability distribution for the best subpopulation, and testing the probability values among elements for being between a lower threshold $\beta$ and an upper threshold $\gamma$ such that:

$$\beta \leq p_i \leq \gamma \quad (24)$$

Where each individual in set $C$ is represented by an integer (non-binary) vector $\{x_1, x_2, \ldots, x_n\}$, determining whether an element is non-converging may comprise, for example, testing the probability value of each possible event for that element to determine if any events have probability above a threshold.

If the probability of any of the elements is determined to have not converged, a SLS is applied over the non-converged elements in block 54 to determine the best solution. In embodiments that provide SLS, the termination condition of test 52 may be relaxed, as compared with embodiments that do not provide SLS, so as to provide for earlier termination. In embodiments, the termination condition of test 52 may comprise, for example, determining whether a sufficient number of elements have converged.

Figure 2:
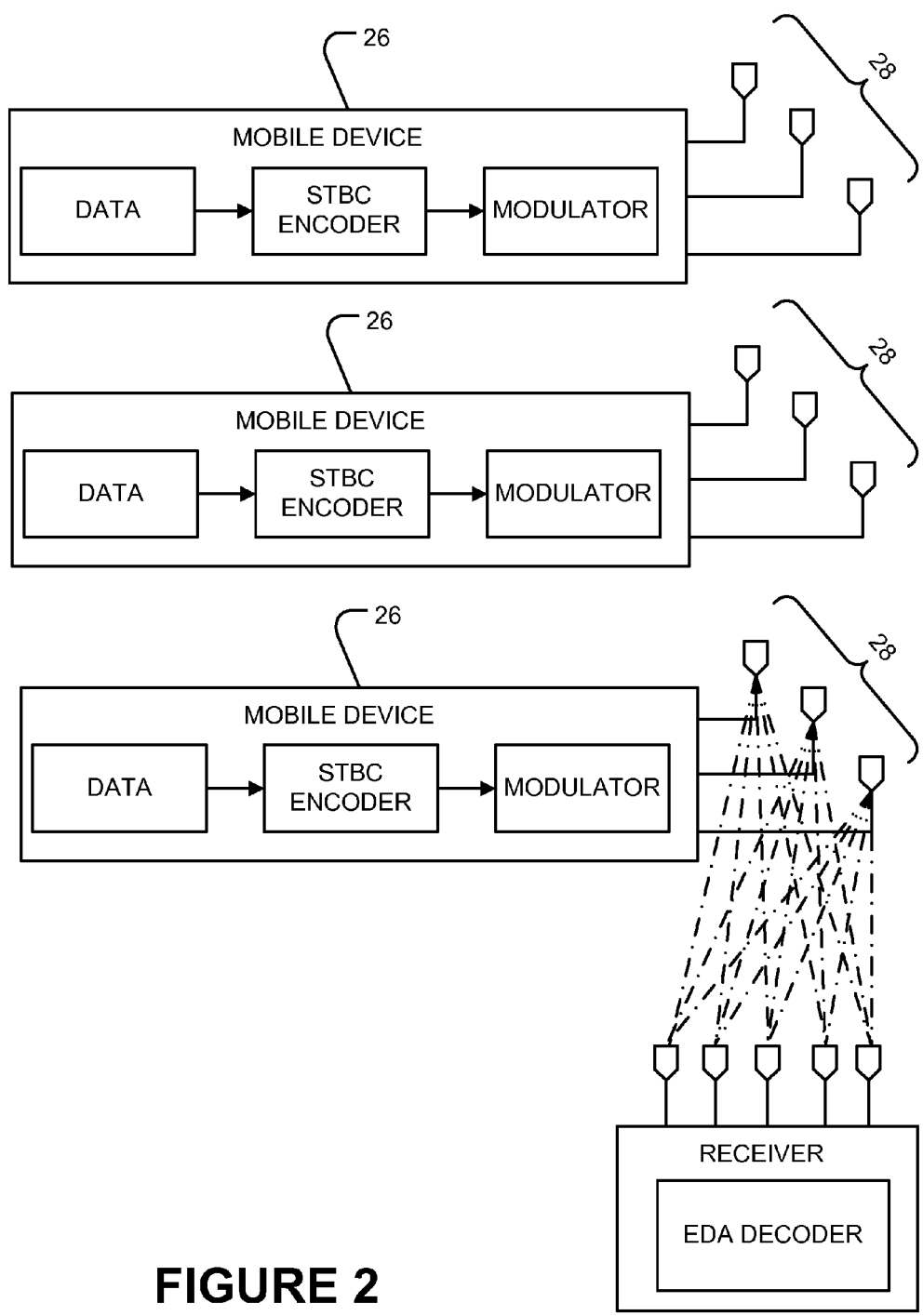
FIG. 2 is a more detailed block diagram of a STBC-MIMO data communication system having the general architecture illustrated in FIG. 1.

One application of the technology described herein is the reception of data transmitted by mobile devices such as cellular telephones or other mobile devices each having multiple transmit antennas. FIG. 2 shows one example of such a system. Each mobile device 26 may transmit data using orthogonal or quasi-orthogonal space time codes. Each mobile device 26 has $N_T$ transmit antennas 28. The total number of all transmit antennas 28 of mobile devices 26 is $A_T$.

The signal received at the $r^{th}$ receive antenna of receiver from the mobile devices 26 in Ts time slots is given by:

$$[Y_r] = [S^1 S^2 \ldots S^K] \begin{bmatrix} H_r^1 \\ H_r^2 \\ \vdots \\ H_r^K \end{bmatrix} + [Z_r] \quad (25)$$

where $S^k$ is a matrix representing symbols transmitted by the $k^{th}$ mobile device. $S^k$ has dimension $T_S \times N_T$. $H_r^k$ is the matrix that describes the channels from $N_T$ transmit antennas to the $r^{th}$ receive antenna. $H_r^k$ has dimension $N_T \times 1$. $Z_r$ represents noise. In some embodiments the noise is assumed to have the form of complex additive white Gaussian noise. The dimension of $Y_r$ is $T_S \times 1$.

For R receive antennas the received signals can be represented as:

$$[Y_1 Y_2 \ldots Y_R] = [S^1 S^2 \ldots S^K] \begin{bmatrix} H_1^1 & H_2^1 & \vdots & H_R^1 \\ H_1^2 & H_2^2 & \vdots & H_R^2 \\ \ldots & \ldots & \vdots & \ldots \\ H_1^K & H_{r2}^K & \vdots & H_R^K \end{bmatrix} + [Z_1 Z_2 \ldots Z_R] \quad (26)$$

Equation (26) has the same form as Equation (2). The detector at the receiver attempts to recover the matrix S of transmitted symbols S from the received vector Y. Where $N_B$ symbols are transmitted in each space-time code block the detector essentially needs to choose the one of $M^{N_B}$ possible transmitted symbols that is most consistent with the received vector Y. In some embodiments the data encoding scheme is set up so that $N_B$ is equal to the total number of transmit antennas $N_T \times K$. This can be advantageous.

In an example embodiment, an EDA as described herein is applied to decode received signals. The EDA may use as a fitness function:

$$F = \arg \min \|Y - SH\|^2 \quad (27)$$

where $\| \|$ denotes the Frobenius norm. The search space is $I = \{0,1\}^n$ where $n = N_B \log_2(M)$.

Simulation Results

For performance comparison, simulations were performed to compare the operation of an EDA detector and an EDA-SLS detector in a STBC MIMO system as described herein with some existing detection technologies. In the simulations each channel is assumed to be quasi-static for time slots, but independent among different mobile devices.

Figure 6:
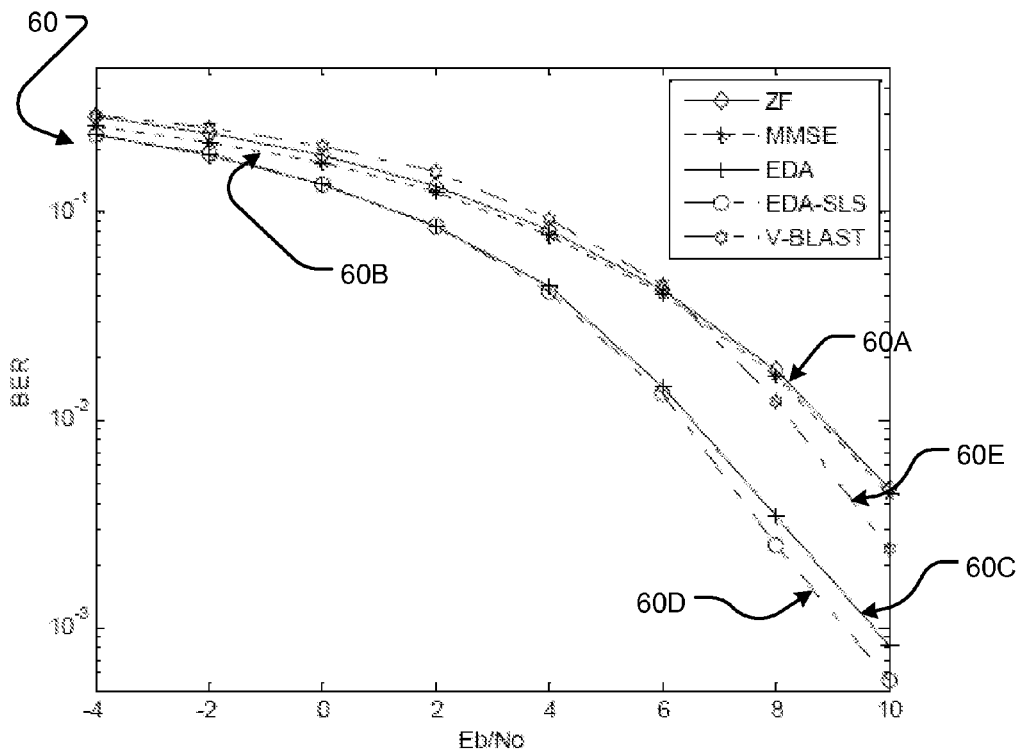
FIGS. 6 and 7 are graphs illustrating BER performance of various STBC-MIMO detection algorithms.

FIG. 6 shows a graph 60 of the BER performance of ZF, MMSE, V-BLAST, EDA and EDA-SLS detectors for k=4, $N_T$=2, $T_S$=2, $\Delta$=50, $\eta$=25 and $I_t$=30. In graph 60, ZF curve is 60A, MMSE curve is 60B, EDA is curve 60C, EDA-SLS is curve 60D and V-BLAST is curve 60E. As shown by the simulation result, there is SNR gain of 1.8 and 2.0 dB at BER of $10^{-2}$ for EDA and EDA-SLS, respectively, over ZF and MMSE. There is a gain of 1.5 dB at BER $10^{-2}$ as compared with ZF-VBLAST.

Figure 7:
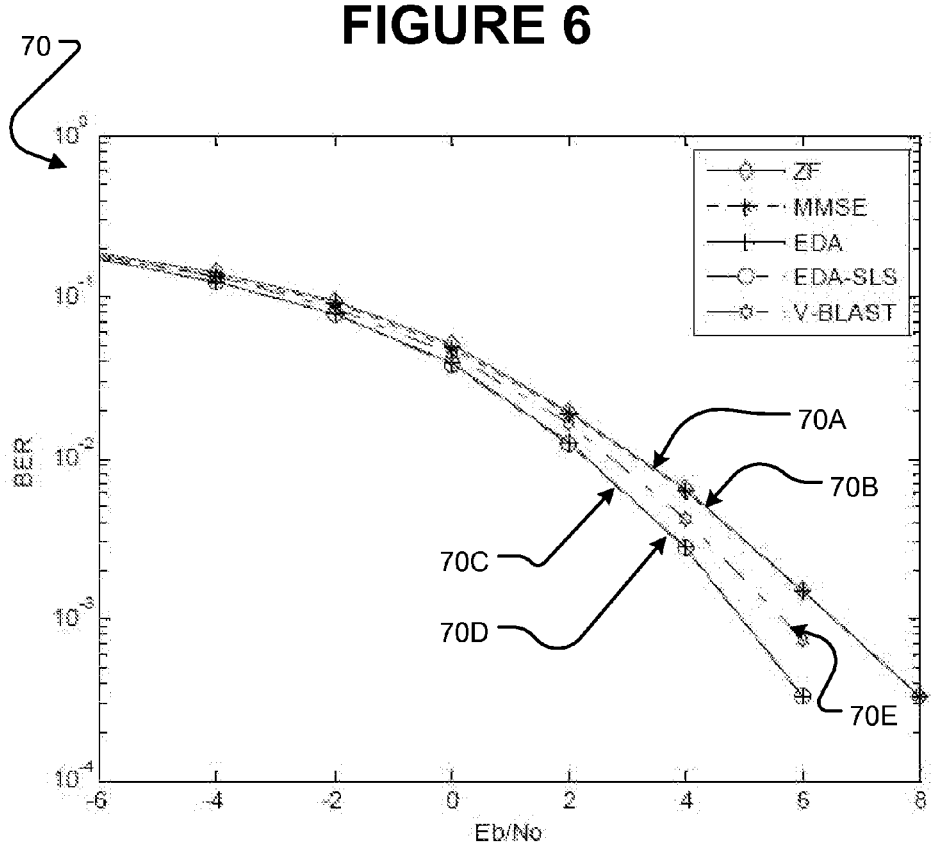

FIG. 7 shows a graph 70 of the BER performance of ZF, MMSE, V-BLAST, EDA and EDA-SLS detectors for k=4, $N_T$=4, $T_S$=8, $\Delta$=120, $\eta$=60 and $I_t$=30. In graph 70, ZF curve is 70A, MMSE curve is 70B, EDA is curve 70C and EDA-SLS is curve 70D and V-BLAST is curve 70E. As shown by the simulation results, there is SNR gain of 1.1 and 1.0 dB at BER of $10^{-2}$ for EDA and EDA-SLS, respectively, over ZF and MMSE. There is a SNR gain of 0.5 dB at BER $10^{-2}$ as compared with VBLAST.

Figure 8:
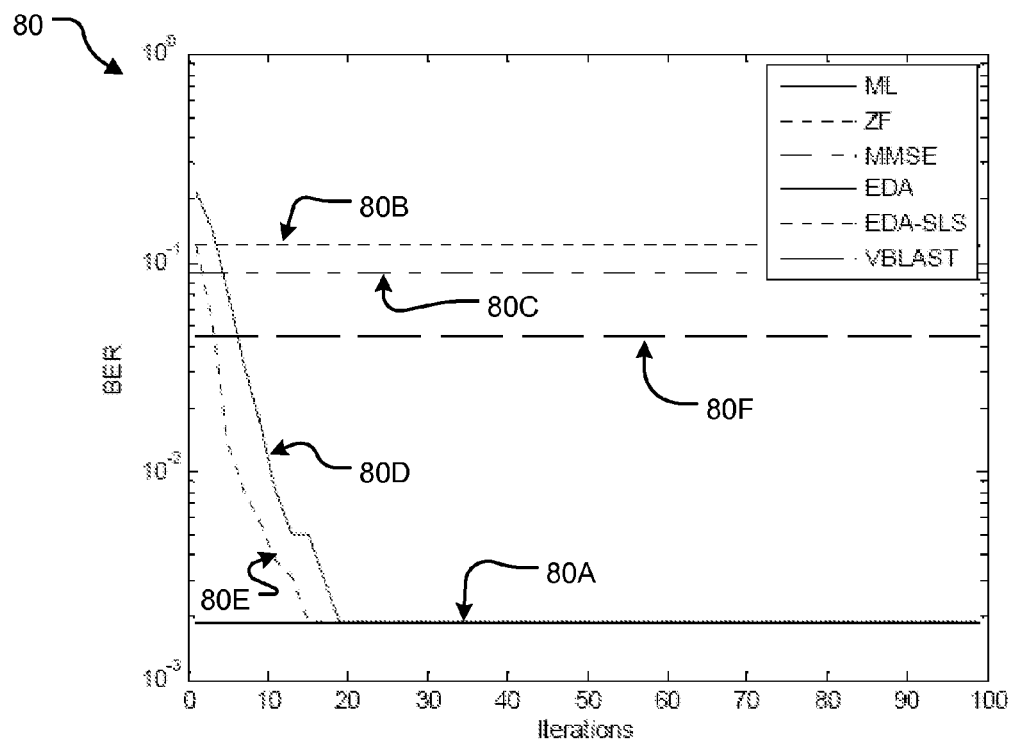
FIG. 8 is a graph that illustrates BER performance of the EDA and EDA-SLS methods as a function of the number of iterations.

FIG. 8 shows a graph 80 of how the performance of EDA and EDA-SLS detectors improves as their iterations of evolution increase. The SNR is fixed to 6 dB, and the size of the population is fixed to 30. The rest of the parameters are the same as those used to generate results in FIG. 6. In graph 80, ZF curve is 80A, MMSE curve is 80B, V-BLAST is curve 80C, EDA is curve 80D, and EDA-SLS is curve 80E. According to FIG. 8, the performance of EDA and EDA-SLS rapidly converges to that of the ML detector (an optimal detector) as the number of iterations increases.

Figure 9:
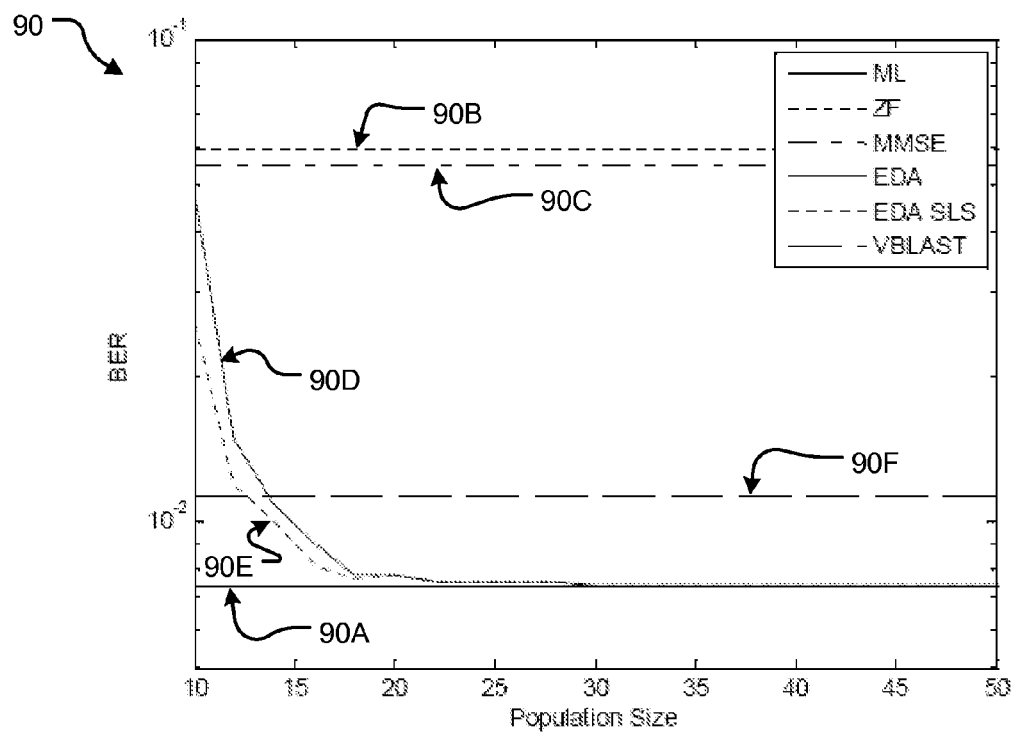
FIG. 9 is a graph illustrating BER performance of the EDA and EDA-SLS methods as a function of population size.

FIG. 9 shows a graph 90 of how the performance of EDA and EDA-SLS detectors improves as the population size in the evolution increases. In this simulation, the number of evolutionary iterations is fixed to 30. The SNR is fixed to 6 dB. The rest of the parameters are the same as those of FIG. 6. In graph 90, ZF curve is 90A, MMSE is curve 90B, V-BLAST is curve 90C, EDA is curve 90D and EDA-SLS is curve 90E.

According to FIG. 9, the performance of EDA and EDA-SLS rapidly converges to that of the ML detector as the population size increases.

Embodiments of the invention are suitable for use in a range of applications. For example, the embodiments of the invention may be used in mobile phones, mobile phone chipsets, wireless networking devices, and wireless networking chipsets. Embodiments may be used in wireless communications chipsets adapted to support communications according to any of Code Division Multiple Access, Wideband Code Division Multiple Access, Evolved Universal Mobile Telecommunications System Terrestrial Radio Access, the IEEE 802.11 standards, the IEEE 802.16 standards, and the ETSI HiperMAN standard, for example.

Computations performed in embodiments could be done one or more programmed processors (e.g. microprocessors, CPUs, DSPs, GPUs), FPGAs (or other configurable logic devices), ASICs (or other hard logic circuits), a combination thereof or the like. Computations performed in embodiments may be done using parallel processing. For example, the tasks of generating individuals consistent with an estimated probability distribution and/or calculating the fitnesses of such individuals may be divided among multiple processors. In some embodiments, $\eta$ processors are provided and in each iteration, each of the $\eta$ processors determines a fitness for one individual.

In some embodiments, multiple processors are provided and each of the multiple processors is configured to determine a fitness for some number of individuals. For example, each processor may determine fitnesses for two individuals in each iteration. Where parallel processors are applied, in some embodiments the same processors are applied to generate individuals consistent with an estimated probability distribution and/or calculate the fitnesses of such individuals. In some embodiments a first group of parallel processors is configured for generating individuals consistent with an estimated probability distribution and a second group of parallel processors is configured for determining the fitnesses of individuals generated by the first group of parallel processors.

Figure 10:
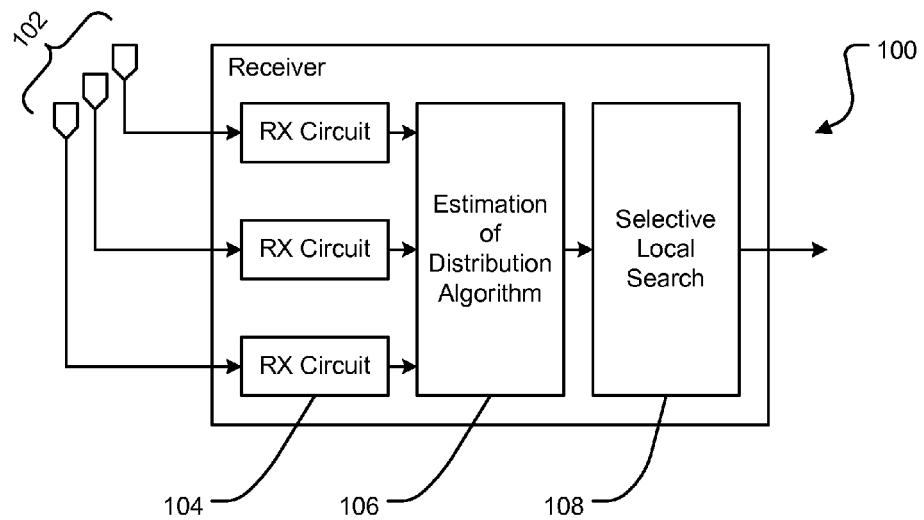
FIGS. 10 and 11 are block diagrams of receivers according to example embodiments.

A receiver according to an embodiment may comprise specific functional units. FIG. 10 shows a block diagram of a receiver 100 according to an example embodiment. Antennas 102 receive signals, which are processed by receiver circuits 104. Receiver circuits provide received signal information to an EDA module 106. EDA module 106 provides an under-determined solution to a SLS module 108. An under-determined solution may comprise an indication of the values of solution elements that have settled to a dominant value and indication of which solution elements have not settled to a dominant value. SLS module 108 provides an output comprising the receiver's estimate of the information transmitted to receiver 100.

Figure 11:
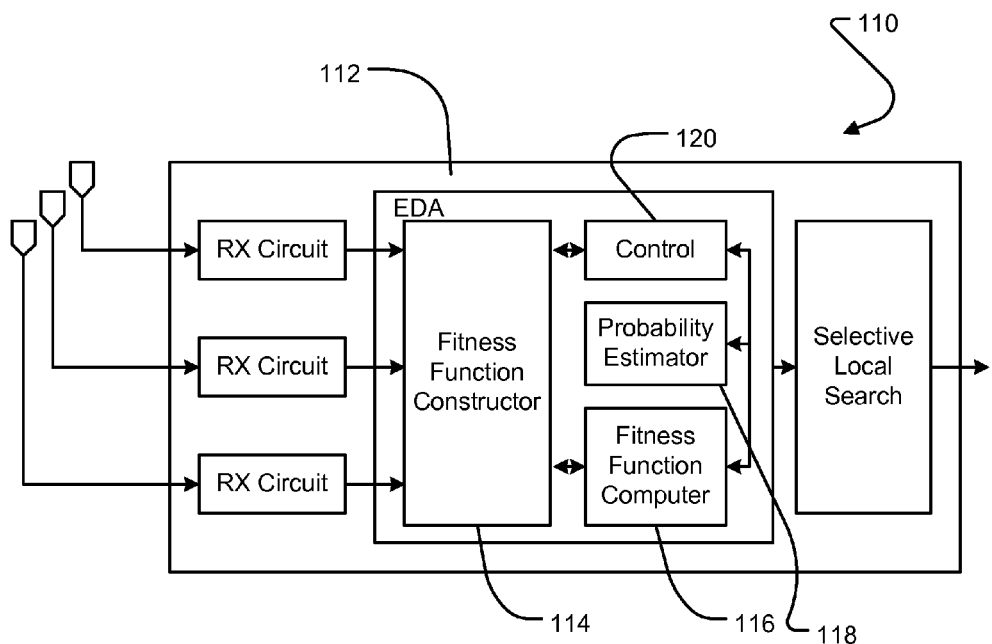

FIG. 11 is a block diagram showing a receiver 110 according to an example embodiment. EDA module 112 comprises a controller 120, a fitness function constructor 114, a fitness function computer 116 and a probability estimator 118. Controller 120 may control the operation of fitness constructor 114, fitness function computer 116 and probability estimator 118. Controller 120 may control the exchange or supply of data to some or all of fitness function constructor 114, fitness function computer 116 and probability estimator 118 and/or control the flow of data in and out of some or all of fitness function constructor 114, fitness function computer 116 and probability estimator 118. Fitness function constructor 114 is configured to construct a fitness function from received signal information. Fitness function computer 116 is configured to apply the fitness function to members of a set of candidate solutions. Probability estimator 118 is configured to compute a probability distribution of values for elements of a solution space based on a set of candidate solutions.

Receiver 110 may comprise adaptations to reduce the likelihood that EDA module 112 will become stuck in a local optimum due to premature convergence of the probability mass to a particular point in the domain of the distribution. For example, EDA module 112 may comprise logic or circuits for clamping the probabilities determined by probability estimator 118, functions or look-up tables for mapping probabilities determined by probability estimator 118 to non-deterministic probabilities or combinations thereof. Either or both of controller 120 or probability estimator 118 may comprise such adaptations, or the like. In some embodiments, controller 120 is configured to salt the population of candidate solutions input to probability estimator 118 with values that skew the probability distribution determined by probability estimator 118 away from deterministic probabilities.

Receiver 110 may comprise means for smoothing a probability distribution determined by probability estimator 118, for example, a memory to hold one or more probability distribution from one or more previous iterations, and an averager configured to determine and average, such as a weighted average, of probability distributions.

Certain implementations of the invention comprise computer processors which execute software instructions which cause the processors to perform a method of the invention. For example, one or more processors in a receiver may implement the methods of FIG. 3, 4, or 5 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

embodiments may implement EDA-like algorithms.

Accordingly, the scope of the invention is to be construed in accordance with the substance defined by the following claims.

What is claimed is:

1. A method for receiving data, the method comprising:
  receiving a set of signals carrying an encoded source data sequence, the source data sequence comprising a plurality of elements,
  obtaining an initial possible solution set comprising a plurality of possible data sequences and making the initial possible solution set a current possible solution set;
  constructing a fitness function based on the received set of signals and
  generating additional possible solution sets by:
  a) determining a fitness of each of the possible data sequences in the current possible solution set using the fitness function;
  b) identifying a fittest subset of the plurality of possible data sequences in the current possible solution set for which the fitnesses are best;
  c) based on the fittest subset, establishing an estimated probability distribution, the estimated probability distribution comprising a set of probability values, the probability values corresponding to possible values for elements of the source data sequence; and
  d) constructing one or more additional possible data sequences consistent with the estimated probability distribution; and
  e) creating a new current possible solution set including at least the additional possible data sequences; and,
  iterating a) through e) until a termination condition is satisfied.

2. The method according to claim 1 wherein the encoded source data sequence comprises space time frequency block coded (STFBC) data.

3. The method according to claim 1 wherein the encoded source data sequence comprises space time block coded (STBC) data.

4. The method according to claim 3 wherein:
  the source data sequence is one of a finite set of valid source data sequences, the valid source data sequences having a vector representation in which each valid source data sequence can be represented by a specific selection of component values in a vector comprising one or more components, each component having a value selected from a corresponding finite set of valid values;
  the estimated probability distribution has a representation as a collection of sub-distributions, each of the sub-distributions associated with a subset comprising one or more components in the vector representation of the valid source data sequences; and
  each sub-distribution comprises an array of subset probability values, the subset probability values representing likelihoods that the one or more components of the associated subset of components of the vector representation take specific valid values of the corresponding sets of valid values;
  wherein establishing the estimated probability distribution comprises setting values for the components of the arrays of the sub-distributions.

5. The method according to claim 4 wherein establishing the estimated probability distribution comprises:
  for each of the sub-distributions, setting the probability values for the corresponding array of subset probability values according to a proportion of the possible data sequences of the fittest subset that have the corresponding value or values in the associated subset of components of the vector representation.

6. The method according to claim 5 wherein establishing the estimated probability distribution comprises:
  setting the corresponding probability value to be greater than the proportion when the proportion is lower than a first threshold; and
  setting the corresponding probability value to be less than the proportion when the proportion is greater than a second threshold.

7. The method according to claim 4 comprising:
  identifying a non-converged set comprising those of the sub-distributions for which none of the subset probability values is closer to 1 than a threshold; and,
  constructing a solution vector representing the source data sequence and performing an exhaustive search to determine values for those of the components of the solution vector that correspond to the sub-distributions of the non-converged set that result in the solution vector best matching the received set of signals.

8. The method according to claim 1 wherein establishing the estimated probability distribution comprises setting the probability values such that the probability values are non-deterministic.

9. The method according to claim 1 wherein a range of each of the probability values is restricted to probability values between a lower threshold having a value greater than zero and an upper threshold having a value corresponding to a probability of less than one.

10. The method according to claim 1 wherein establishing the estimated probability distribution comprises setting the probability values such that all of the probability values lie in a range between a lower value representing a non-zero probability and an upper value representing a probability of less than certainty.

11. The method according to claim 1 wherein creating the new current possible solution set comprises including in the new current possible solution set one or more of the possible data sequences of the fittest subset.

12. The method according to claim 1 wherein:
  establishing the estimated probability distribution comprises setting each of the probability values based on a proportion of the corresponding elements in the possible data sequences of the fittest subset that have a corresponding value or set of values.

13. The method according to claim 12 comprising setting the corresponding probability value to be greater than the proportion when the proportion is lower than a first threshold; and setting the corresponding probability value to be less than the proportion when the proportion is greater than a second threshold.

14. The method according to claim 13 comprising, if the proportion is lower than the first threshold, setting the corresponding probability value to be equal to the first threshold.

15. The method according to claim 13 comprising, if the proportion is greater than the second threshold, setting the corresponding probability value to be equal to the second threshold.

16. The method according to claim 13 wherein separate first thresholds are provided for each of a plurality of the values.

17. The method according to claim 13 wherein separate second thresholds are provided for each of a plurality of the values.

18. The method according to claim 1 comprising determining that the termination condition is satisfied when a fitness of a fittest one of the plurality of data sequences in the current possible solution set is better than a termination threshold.

19. The method according to claim 18 comprising determining that the termination condition is satisfied when a number of iterations has exceeded a limit.

20. The method according to claim 1 wherein obtaining the initial possible solution set comprises generating the plurality of possible data sequences randomly or quasi-randomly.

21. The method according to claim 1 wherein obtaining the initial possible solution set comprises retrieving the plurality of possible data sequences from a data store.

22. The method according to claim 1 wherein obtaining the initial possible solution set comprises performing a sub-optimal search algorithm based upon the received set of signals.

23. The method according to claim 22 wherein the sub-optimal search algorithm comprises an algorithm selected from the group consisting of: Zero Forcing; Minimum Mean Square Error; and Vertical Bell Laboratories Layered Space Time algorithms.

24. The method according to claim 1 comprising, after the termination condition is satisfied:
identifying one or more non-converged elements for which the corresponding probability values are below a threshold probability and performing a selective local search to identify values for the non-converged elements which result in a highest fitness.

25. The method according to claim 1 wherein constructing the one or more additional possible data sequences comprises modifying one or more of the possible data sequences in the current possible solution set according to a probabilistic or semi-probabilistic rule.

26. The method according to claim 25 comprising generating the rule based at least in part upon the estimated probability distribution for the current possible solution set.

27. The method according to claim 1 wherein establishing the estimated probability distribution comprises computing a weighted average of a probability distribution derived from a current possible solution set of a prior iteration and a probability distribution derived from the current possible solution set.

28. The method according to claim 1 wherein estimated probability distribution comprises weighting possible data sequences of the current possible solution set according to their fitnesses.

29. A data receiver comprising:
a plurality of antennas signal detectors for detecting signals received at the antennas;
a data detection module configured to receive the detected signals and configured to:
construct a fitness function based on the received set of signals;
generate additional possible solution sets by:
a) determining a fitness of each of the possible data sequences in the current possible solution set using the fitness function;
b) identifying a fittest subset of the plurality of possible data sequences in the current possible solution set for which the fitnesses are best;
c) based on the fittest subset, establishing an estimated probability distribution, the estimated probability distribution comprising a set of probability values, the probability values corresponding to possible values for elements of the source data sequence; and
d) constructing one or more additional possible data sequences consistent with the estimated probability distribution; and
e) creating a new current possible solution set including at least the additional possible data sequences; and,
iterate a) through e) until a termination condition is satisfied.

30. A data receiver comprising:
a plurality of antennas;
signal detectors for detecting signals received at the antennas;
a data detection module connected to receive the detected signals and configured to process the detected signals according to an Estimation of Distribution Algorithm to yield a received data sequence; and
a data output
wherein the data detection module is configured to process the detected signals iteratively in a series of iterations in which at least one of the iterations comprises: randomly or quasi-randomly generating candidate solutions consistent with a probability distribution estimated in a previous iteration; evaluating fitness values of the candidate solutions; selecting best ones of the candidate solutions based on the fitness values; and estimating a new probability distribution based on the best ones of the candidate solutions.

31. The method according to claim 1 wherein receiving the set of signals comprises receiving at a plurality of receive antennas signals transmitted at a plurality of transmit antennas and constructing the fitness function is based in part on a previously-determined set of channel gains for channels between the transmit antennas and the receive antennas.

* * * * *

UNITED STATES PATENT AND TRADEMARK OFFICE
CERTIFICATE OF CORRECTION

PATENT NO. : 8,391,421 B2
APPLICATION NO. : 12/488503
DATED : March 5, 2013
INVENTOR(S) : Daniel Chonghwan Lee et al.

Page 1 of 1

It is certified that error appears in the above-identified patent and that said Letters Patent is hereby corrected as shown below:

On the Title page of the issued patent, the Related U.S. Application Data, appearing as "Provisional application No. 61/129,328, filed on Jun. 19, 2008." is amended to --Provisional application No. 61/129,328, filed on Jun. 19, 2008; Provisional application No. 61/193,567, filed on Dec. 8, 2008.--

Signed and Sealed this
Fourteenth Day of May, 2013

Teresa Stanek Rea
*Acting Director of the United States Patent and Trademark Office*